(12) United States Patent
Beckford et al.

(10) Patent No.: US 8,568,082 B2
(45) Date of Patent: Oct. 29, 2013

(54) BLADE AND A METHOD FOR MAKING A BLADE

(75) Inventors: Peter Rowland Beckford, Derby (GB); Simon Read, Derby (GB); Ian Colin Deuchar Care, Derby (GB)

(73) Assignee: Rolls-Royce PLC (GB)

( * ) Notice: Subject to any disclaimer, the term of this patent is extended or adjusted under 35 U.S.C. 154(b) by 904 days.

(21) Appl. No.: 12/547,697

(22) Filed: Aug. 26, 2009

(65) Prior Publication Data

US 2010/0054938 A1 Mar. 4, 2010

(30) Foreign Application Priority Data

Aug. 27, 2008 (GB) .................................. 0815482.5

(51) Int. Cl.
*F01D 5/30* (2006.01)

(52) U.S. Cl.
USPC .......................................................... 415/9

(58) Field of Classification Search
USPC ..... 416/2, 223 A, 224, 248, 244 A, 204, 215, 416/219 R; 29/527.3, 527.5, 889.21, 29/889.22; 415/9, 198 A
See application file for complete search history.

(56) References Cited

U.S. PATENT DOCUMENTS

| | | | |
|---|---|---|---|
| 2,362,804 A | 11/1944 | Cox, Jr. | |
| 2,859,936 A | 11/1958 | Warnken | |
| 2,925,250 A | 2/1960 | Whitehead | |
| 3,057,767 A | 10/1962 | Kaplan | |
| 3,132,841 A | 5/1964 | Wilder, Jr. | |
| 3,519,368 A * | 7/1970 | Howald | 416/216 |
| 3,679,324 A | 7/1972 | Stargardter | |
| 3,694,104 A * | 9/1972 | Erwin | 416/217 |
| 3,744,927 A | 7/1973 | Bernaerts | |
| 3,749,518 A | 7/1973 | Alver et al. | |
| 3,756,745 A | 9/1973 | Alver et al. | |
| 4,037,990 A * | 7/1977 | Harris | 416/220 R |
| 4,040,770 A * | 8/1977 | Carlson | 416/230 |
| 4,111,600 A | 9/1978 | Rothman et al. | |

(Continued)

FOREIGN PATENT DOCUMENTS

| | | |
|---|---|---|
| EP | 1555391 A2 | 7/2005 |
| EP | 1881158 A2 | 1/2008 |

(Continued)

OTHER PUBLICATIONS

European Search Report dated Sep. 11, 2012 from corresponding European Patent Application No. EP 09 25 1814.

*Primary Examiner* — Nathaniel Wiehe
*Assistant Examiner* — Woody A Lee, Jr.
(74) *Attorney, Agent, or Firm* — McCormick, Paulding & Huber LLP

(57) ABSTRACT

International regulations for aerofoils within gas turbine engines require the safe containment of a released aerofoil. The blade fragments must be contained within an engine casing. Smaller fragments will generally be easier to contain within the casing and therefore reduce the weight of that casing. However introducing lines of weakness may result in cavities and holes which are subject to moisture ingress and problems associated therewith. By providing a root section which incorporates a core having shear surfaces, blades can be designed which in normal use are subject to compressive loads and remain operational, but when subject to impact loads or bending forces create tension forces which cause fragmentation along the shear surfaces after initial energy losses by slippage. By providing the shear surfaces in cores their location is encapsulated avoiding problems with moisture ingress.

14 Claims, 5 Drawing Sheets

(56) References Cited

U.S. PATENT DOCUMENTS

| | | |
|---|---|---|
| 4,343,593 A | 8/1982 | Harris |
| 4,492,521 A | 1/1985 | Pask et al. |
| 4,730,984 A | 3/1988 | Ortolano |
| 5,018,271 A | 5/1991 | Bailey et al. |
| 5,102,302 A * | 4/1992 | Schilling et al. ............... 416/224 |
| 5,160,243 A * | 11/1992 | Herzner et al. ........... 416/220 R |
| 5,176,499 A | 1/1993 | Damlis et al. |
| 5,314,307 A * | 5/1994 | Farmer ............................. 416/2 |
| 5,340,280 A * | 8/1994 | Schilling ................... 416/229 A |
| 5,405,102 A | 4/1995 | Greene |
| 5,443,367 A | 8/1995 | Samit et al. |
| 5,490,764 A | 2/1996 | Schilling |
| 5,749,706 A | 5/1998 | Maar |
| 6,402,469 B1 * | 6/2002 | Kastl et al. ......................... 416/2 |
| 6,431,837 B1 | 8/2002 | Velicki |
| 6,467,168 B2 | 10/2002 | Wallis |
| 6,536,208 B1 | 3/2003 | Kretschmer |
| 6,609,884 B2 | 8/2003 | Harvey |
| 6,739,049 B2 | 5/2004 | Nicholson |
| 7,025,560 B2 * | 4/2006 | Clark ................................ 415/9 |
| 7,112,044 B2 | 9/2006 | Whitehead et al. |
| 7,118,346 B2 * | 10/2006 | Read .............................. 416/232 |
| 7,311,500 B2 | 12/2007 | Rongong et al. |
| 7,448,845 B2 * | 11/2008 | Stephenson et al. .............. 415/9 |
| 7,758,311 B2 | 7/2010 | Loehle et al. |
| 8,016,561 B2 | 9/2011 | Moniz et al. |
| 2005/0158171 A1 | 7/2005 | Carper et al. |
| 2008/0019838 A1 * | 1/2008 | Read et al. ..................... 416/243 |
| 2010/0054938 A1 | 3/2010 | Beckford et al. |

FOREIGN PATENT DOCUMENTS

| | | |
|---|---|---|
| GB | 1332679 | 11/1970 |
| GB | 1473147 A | 5/1977 |
| GB | 2399866 A | 9/2004 |
| WO | 96/34181 | 10/1996 |
| WO | 2007048996 A1 | 5/2007 |

* cited by examiner

US 8,568,082 B2

BLADE AND A METHOD FOR MAKING A BLADE

CROSS REFERENCE TO RELATED APPLICATION

This application is entitled to the benefit of British Patent Application No. GB 0815482.5, filed on Aug. 27, 2008.

FIELD OF THE INVENTION

The present invention relates to blades and more particularly to blades produced for gas turbine engines.

BACKGROUND OF THE INVENTION

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts 26, 28, 30.

It will be understood that in order to accommodate for the possible occurrence of blade fragmentation the casing parts of the engine must be able to restrain blade and other debris. In such circumstances these casing parts are typically thicker and specified to provide a degree of surety with respect to such blade fragment containment. One approach is to reduce the energy transfer to the casing by encouraging controlled break up of the blade when inevitable and in particular of the blade root fragments. It will be understood as blades become lighter through having a hollow construction or composite construction the root section increasingly incorporates a larger percentage of blade mass.

As indicated above it is known to encourage break up of blade fragments in order to reduce localised impact energy transfer and therefore casing requirements. One approach to encouraging such break up is through introducing lines of weakness in the form of a break line. These lines of weakness are drilled or otherwise machined into the blade. A disadvantage of such an approach is that the blade and in particular a composite blade will include a moisture path in the line of weakness which may then precipitate cracking through freeze-thaw cycles. It will be understood that premature cracking will result in a shorter operational life for the blade and therefore increase costs for maintenance as well as replacement. Further problems with respect to lines of weakness in a blade are the potential for tool breakage and damage to the blade which as will be understood at this stage is a high value component. Finally, provision of cavities and other lines of weakness can be difficult to model in terms of responsiveness and add significantly to potential problems with stress in normal operational conditions for the blade.

FIG. 2 provides a schematic illustration of a root fragment 30 in cross section impacting a casing 31. Thus, it will be noted that parts of the fragment 30 engage and react at points 32, 33 with the casing 31 whilst there is a large bending moment 34. The fragment 30 distorts as a result of momentum with a fragment velocity in the direction of arrowhead 35. In such circumstances in a portion 36 of the fragment 30 there will be an increased nominal stress due to the reduced load bearing area along with an increased compliance of the root fragment 30. This results in plasticity and cracking which dissipates energy. Thus, there is a plastic, non-elastic hinge defined about the portion 36 which allows the fragment 30 to flatten and so increase contact area with the casing 31. In cases where the root is curved (as opposed to being straight) the point contact forces are inevitable, as shown in FIG. 2. In such circumstances the larger the fragment 30 the greater the energy of impact with the casing 31 and therefore potential breach. In such circumstances the casings 31 need to be relatively thick and therefore add significantly to overall weight requirements for an engine in an aircraft. As will be appreciated weight is a significant design consideration with respect to aircraft.

SUMMARY OF THE INVENTION

According to one aspect of the present invention, a blade for a gas turbine engine includes a root section, at least two frangible parts to define a core for the root section, and a shear surface between said two fragile parts whereby the core remains stable other than under a predetermined tension load in a plane of the root section.

According to another aspect of the present invention, a method of forming a blade includes the steps of defining a root section having a hollow cavity to receive a core, forming a core with at least two frangible parts having a shear surface between the two frangible parts and associating the core with the hollow cavity to remain integral other than under a predetermined tension load in a plane of the root section.

DETAILED DESCRIPTION OF THE PREFERRED EMBODIMENTS

Figure 1:
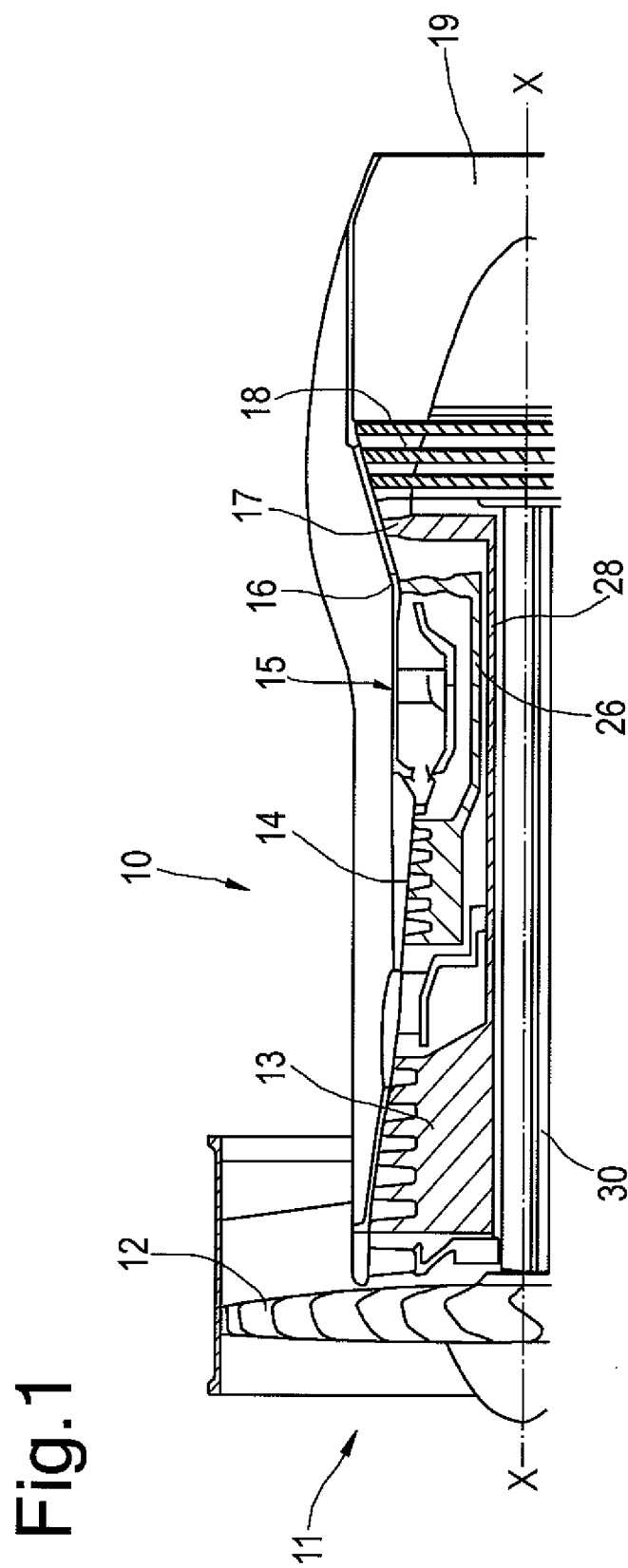
FIG. 1 is a simplified schematic illustration in section of a portion of a gas turbine engine.

In accordance with the invention a root section for a blade for utilisation in gas turbine engines is constructed and manufactured to incorporate one or more shear layers. These shear layers are provided generally within a core defining a wedge in the root. Generally, the shear layers are located between neighbouring material in order to define parts which are frangible with respect to each other. Typically the layers are created through a plurality or set of segments associated together with a disjoint or slip layer between them. This disjoint or slip layer can be created through provision of a layer of non-adhesive solid, liquid or gel such as a silicon paste. In such circumstances the disjoint or slip layer is non-adhesive to the respective parts defining the core or side by side segments. An alternative would be to provide a layer of lower strength material which either crumbles, shatters or shears when subject to tension. An example of such a lower strength material may be a cryano-acrylic glue, which is strong in tension but weak in shear; or possibly an alumina and mullite ceramic matrix. Another example of a lower strength joint is a closed bag with one surface bonded onto each segment and the edges of the bag forming the low strength shear joint. Once the core is located within a cavity of the root section the whole can be moulded and manufactured in accordance with usual manufacturing procedures.

By providing for fragmentation through provision of frangible parts combined in normal use through the shear surface it will be understood that less impact energy will be presented to the casing and therefore potentially a thinner casing may be used reducing weight particularly in aircraft installations. It will be appreciated that it is important that the root section remains acceptable for normal blade operations. In such circumstances generally the root section will only be subject to fragmentation or slippage when subject to a predetermined tension load in particular planes. Thus, when confined or in compression the root section will remain robust and compact to enable retention of the blade through the root section in a rotor assembly of a gas turbine engine.

As indicated generally a core is provided within a cavity. The core preferably comprises segments associated through shear layers created as indicated above as disjoints or slip layers of an appropriate form. The parts in the form of segments may be equally or non-equally spaced and be arranged to fragment along the shear surfaces axially, radially or circumferentially or a combination of these axes.

One approach to providing the shear layer is to create a gap between the parts of the core. In such circumstances segments may include abutting cheeks which provide a space between the respective parts or segments. These cheeks may be flat or domed or stippled or lobed or provided through a simple spacer. The section between the parts or segments can then be rendered flexible or rigid through an appropriate filler. Furthermore the filler may be attached to one or both surfaces of the parts or segments in order to create a shear surface. The filling itself may be layered or spaced or synovic or gaseous and respectively filled or not filled dependent upon the requirements with respect to flexibility and shear response. Appropriate filler materials may include foams, a syntactic paste in the form of a non-setting sticky substance or a hook and fleece type joining or stickle brick type joint. The filling may be sheet or woven or layered or non-symmetrically distributed dependent upon requirements.

Aspects of the present invention particularly utilise wedges to define cores within root sections of a blade. These wedge cores can be provided with or without attached non-bonding shear layers.

Figure 3:
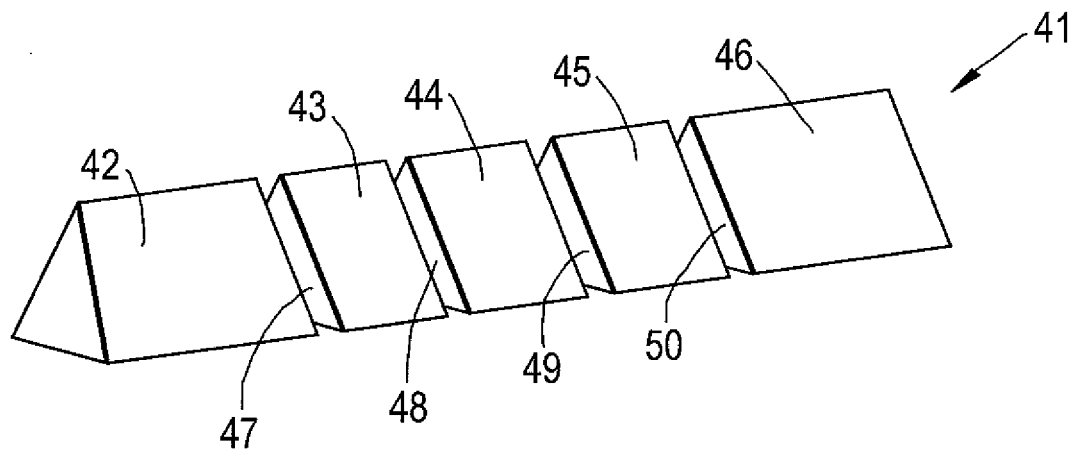
FIG. 3 comprises a schematic illustration of a turbine blade core in accordance with the invention.

With regard to FIG. 3 it will be noted that a core 41 is defined by segments 42 to 46 which are substantially aligned and joined with shear surfaces 47 to 50 between them. It will be appreciated that different mechanisms between these segments 42 to 46 can be utilised with regard to the shear surface and structural parts of a blade (not shown). Generally, the weaker shear surfaces will be in a plane such that under normal operating conditions there is sufficient strength including crush resistance to retain the blade through the root section within a rotor disk. However, under other conditions such as after blade release (blade off) and for impact containment the root section bends and breaks into smaller lower energy segments. These segments or frangible parts will substantially comprise the segments 42 to 46 with dislocation between the segments 42 to 46 at the shear surfaces 47 to 50. Generally, the shear surfaces in the form of discontinuities 47 to 50 will extend into the blade itself usually at a lower section. In such circumstances these dislocations will aid the break up of the blade and therefore avoid heavy sections of the blade remaining after disintegration, which would present high energy impacts with a containment casing.

Figure 4:
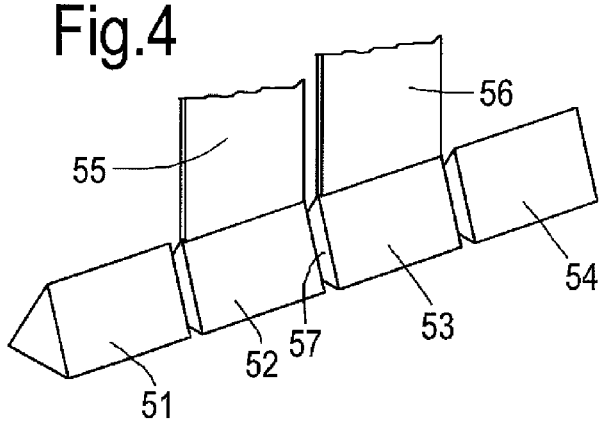
FIG. 4 provides a schematic illustration of turbine blades in accordance with the invention in which a core wedge extends into the blade.

FIG. 4 illustrates the extension of root section parts 51 to 54 to blade sections 55, 56 with a discontinuity or shear surface 57 portion defined by blade portions 55, 56.

Figure 5:
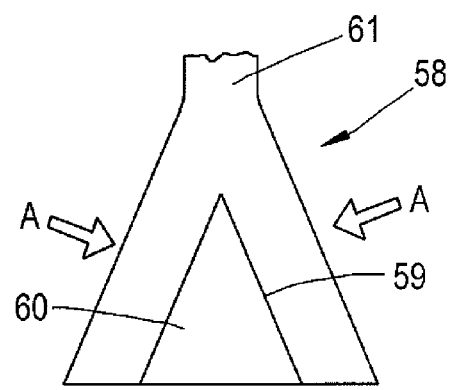
FIG. 5 is a schematic cross section of a root section in accordance with the invention.

FIG. 5 provides a schematic illustration of a root section 58 in accordance with the invention. As can be seen the root section 58 incorporates a cavity 59 within which a core 60 is presented. It is the core 60 which in accordance with the invention has parts which are associated through a shear surface, and so will preferentially fragment or slip, when required, in tension. However, as depicted in FIG. 5, normally in operation the root section 58 is generally in compression in the direction of arrowheads A. This compression prevents any fragmentation or slippage of the core 60 or portions of the root section 58 that might otherwise occur. Furthermore, during manufacture the root section 58 can be configured such that there is a pre-compression of the core: holding the core in position despite the potential frangible break up about the shear surfaces between segments or parts within the core 60. It will be noted that the core 60 is surrounded by structural parts of the section 58 which extends upwards into the blade 61 itself. Generally, the layers of segments or parts defined by the respective frangible surfaces in accordance with aspects of the present invention must withstand the crush forces created by other parts of the root section.

Figure 6:
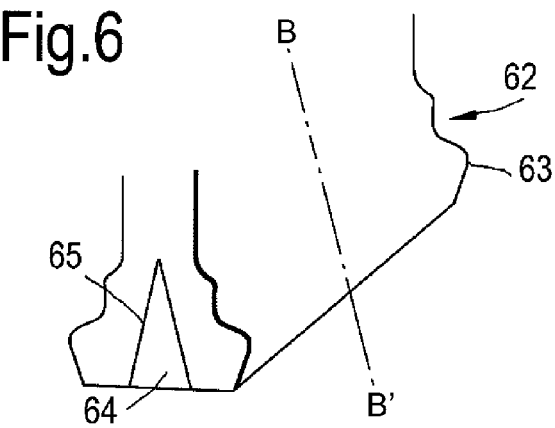
FIG. 6 is a schematic illustration of a root section in accordance with the invention.

FIG. 6 illustrates a typical example of a root section 62 in which the root section incorporates shaping 63 for location within a retaining portion of a rotor disk. As previously a core 64 in the shape of a wedge is provided which extends along the length of the root section 62. This core 64 as indicated previously will comprise parts separated by shear surfaces in accordance with the invention. In such circumstances as depicted in FIG. 6 the core 64 will define and form part of the root section 62 to enable retention within a rotor of the section 62 and associated blade. However, upon frangible release the compression or crushing action upon the section 62 will be removed. Generally in such circumstances the root section 62 will still remain substantially integral unless tension forces are provided in particular planes which will cause fragmentation and disintegration of the section 62 such that impacts with the casing are of a lower impact energy.

In an alternative embodiment of the arrangement shown in FIG. 6, the end segments that take the main impact reactive loads may be an integral part of the main blade lay-up with the identifiable segments in the centre of the blade root in the normally lower compressive stress areas.

Figure 7:
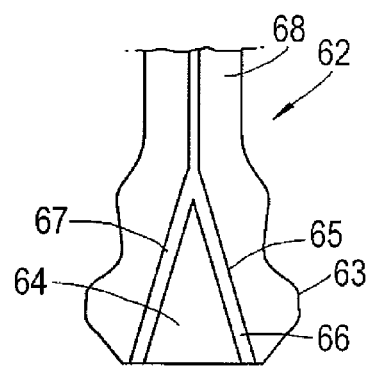
FIG. 7 is a schematic cross section of the root section in the direction A-A depicted in FIG. 6.

FIG. 7 is a cross section of an alternative embodiment of the root section 62 along the line B-B depicted in FIG. 6 corresponding to the wedge frangible point 57 shown in FIG. 4. In this embodiment, the core 64 is spaced from the cavity 65 with a gap or filler 67 between. In some embodiments of the invention, the gap or filler 67 will be open in order to provide a shear surface to facilitate disintegration of the root section 62 in use. Alternatively, in order to withstand the crushing and other compressive forces of normal operation for the root section 62, the gap 67 may be filled. The gap 67 may be filled with a frangible material or as indicated above a non-adhesive solid, liquid or gel or a layer of material of lower strength or foam or other means for creating a shear surface between the wedge 64 and the root section 62 to precipitate fragmentation or slippage when subject to tension in pre-determined planes.

It will be noted that in the embodiment of FIG. 7 the shear surface provided by the gap or filler 67 extends upwardly into the blade portion 68. This may facilitate break up of the aerofoil blade by providing initiation sites for such break up.

It will be appreciated that the core 64 as a root wedge does not need to be fully fragmented although this is preferred. It is by creating the shear surfaces between parts of the core and the root section which will precipitate fragmentation and slippage in the desired planes when subject to tension.

Figure 8:
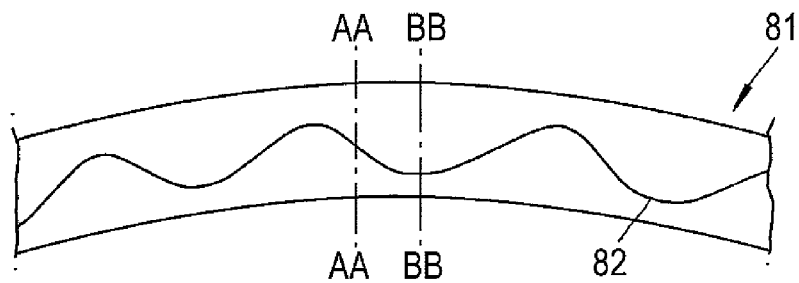
FIG. 8 is a schematic cross section of a core utilised in accordance with a first alternative embodiment of the invention.
Figure 9:
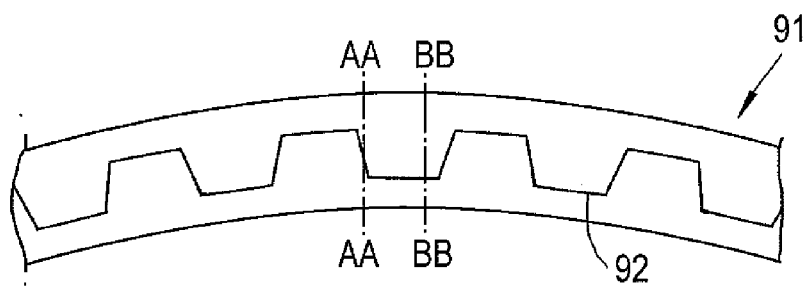
FIG. 9 is a schematic cross section of a core in accordance with a second alternative embodiment of aspects of the invention.
Figure 10:
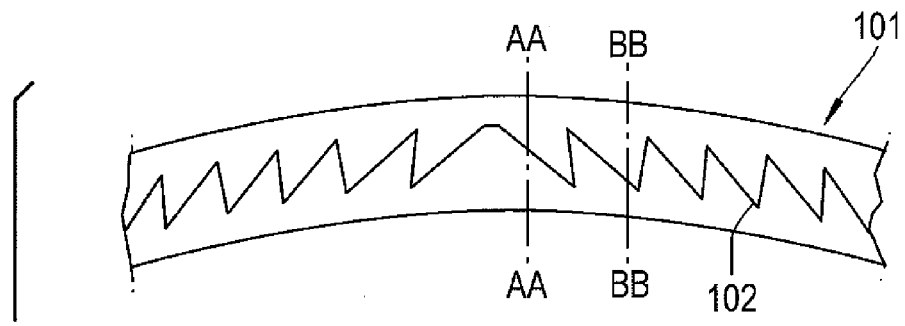
FIG. 10 is a schematic cross section of a core in accordance with the invention.

It will also be possible to provide shear surfaces which extend radially through the root section. Such radial shear surfaces may be provided which prevent the root section and in particular the core within that root section from separating during normal use. FIGS. 8 to 10 provide illustrations of examples of radial shear surfaces. FIG. 10 also incorporates an illustration of a differing shear surface position or radial split at different locations AA-AA and BB-BB. These radial splits could also be present in the earlier radial shear surfaces as depicted in FIG. 8 and FIG. 9.

In FIG. 8 a root section core 81 is depicted in which a radial shear surface is provided by a split 82 which extends radially in a wave oscillation along the core 81.

FIG. 9 illustrates a root section core 91 which incorporates a shear surface in the form of a radial split 92 which extends along the core 91. The shear surface in the form of split 92 has a castellation path as depicted and will provide a desired response to tension forces in particular planes when required to precipitate fragmentation within a root section incorporating the core 91 in accordance with aspects of the present invention.

FIG. 10 illustrates a root section core 101 which incorporates a radial split to act as a shear surface 102. The shear surface 102 follows a sawtooth path along the core 101 and will provide a desired response to tensile loads in planes for the core 101 and therefore the root section incorporating the core 101 in use.

The arrangements shown in FIGS. 8, 9 and 10 are designed to resist the axial shear created by the normal gas loads on the blade which act to untwist the blade. The root crush direction forces also act to hold this in place during normal operation. Under blade-off conditions these shear planes are free to act to aid the fragmentation of the root.

Figure 2:
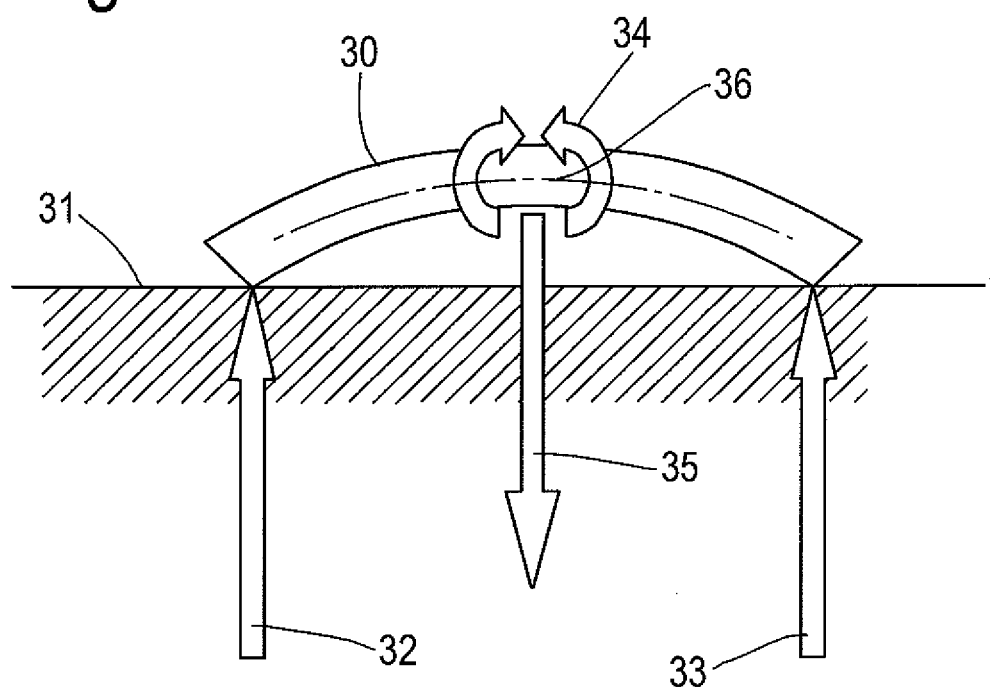
FIG. 2 provides a schematic illustration, in section, of a root fragment of a turbine blade of the type found in the gas turbine of FIG. 1 impacting a casing.

As indicated above the cores 81, 91, 101 will generally be wedge shaped. In such circumstances as depicted in FIG. 10 at cross sections A-A, B-B the split provided may extend centrally through the core 101 or as depicted at cross section BB-BB is slightly off-centre. The positioning of the shear surface in the form of the split 82, 92, 102 may be chosen in order to respond to tension forces, so that an improved break up is achieved. It will be appreciated that this tension can be created by release forces within a gas turbine engine or as a result of impact as described previously with regard to FIG. 2.

FIGS. 8 to 10 provide illustrations of some of the options available for arranging a single radial split in a root core in the form of a wedge such that the core remains in position during normal running but aids break up in tension or impact bending.

As indicated above, generally the core will be located in a cavity of a blade root section. Generally, the core will be covered by a layer of blade material. The thickness of the blade material may be variable such that the root section essentially comprises the core and therefore the shear surfaces provided within the core will act more directly with regard to root section break up. The core will typically be adhered to certain parts of the blade whilst as indicated shear surfaces are provided at other locations to aid and propagate break up in use after an impact event or blade release. In contrast to previous arrangements, therefore, apertures, holes and drilled lines of weaknesses are avoided, which may be susceptible to moisture ingress and detrimental freeze/thaw action causing crack precipitation. In the present invention, shear surfaces will be effectively enclosed (whether those shear surfaces are created by voids or provision of frangible non-adhesive solid/liquid or gel inserts or layers of lower strength material) and so moisture ingress will be inhibited.

Figure 11:
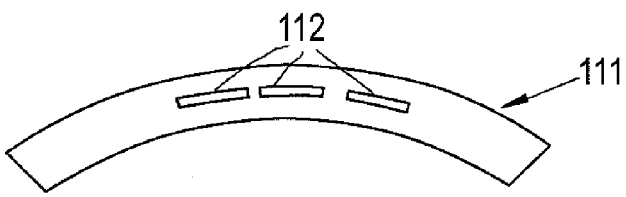
FIG. 11 is a schematic cross section of a blade section incorporating shear surfaces in the form of disjoints in accordance with the invention; and, FIG. 12 provides schematic illustrations of root section configurations in accordance with the invention.

FIG. 11 provides a cross section of a blade 111 across a plane of release. In accordance with the invention the shear surfaces, in the form of laminar disjoints 112, extend from a root section (not shown) up into the blade section 111. As can be seen, the disjoints forming the shear surfaces create enclosed lines of weakness to aid controlled break up of the blade section 111 in use. This break up may utilise the mass distribution of the root section to facilitate disintegration or at least slippage of the blade section 111 such that the resultant fragments have a reduced individual mass and therefore local impact energy against the casing. These disjoints 112, are an alternative embodiment to the root extension segments 55, 56 shown in FIG. 4.

By provision of shear surfaces between respective parts in a root section of a blade, fragmentation is more easily achieved with localised plastic strain reduced for energy transfer similar to previous arrangements. However, by alteration of designs such that there is an increase in the volume of material that is plastically deformed by slippage it will be understood that energy transfer to a casing can be reduced with localised plastic strains remaining unchanged. The particular provision and location as well as configuration of the shear surfaces will depend upon operational requirements. These operational requirements will relate to materials used, operational cycling and necessary considerations with regard to containment.

In terms of manufacturing a blade in accordance with aspects of the present invention it will be appreciated that initially a root section is provided which incorporates a cavity or other means for accommodation of a core in accordance with aspects of the present invention. As indicated previously this core will typically take the form of a wedge or can be referred to as a wedge even when having different cross sections. The core will be retained within the root section such that subsequent processes with regard to the blade will be as previously defined in the root section configuration for location within a rotor disk of a gas turbine engine. Thus, aspects of the present invention require no further machining of a finished blade such that the chances of mistakes are reduced and even if there are mistakes these are at a cheaper component stage so the consequences and costs of scrapping much smaller. Aspects of the present invention relate to provision of a core incorporating the parts defining the shear surface between them during initial blade manufacturing processes and therefore at a relatively early stage in the blade manufacturing process.

The root section and in particular the core and any shear surfaces extending into the blade section are essentially sealed and therefore eliminate the possibility of ingress of fluids and inherent problems with such ingress.

As the blade cavity in which the core is presented remains essentially sealed it will be appreciated that conventional tap testing and other NDE scanning methods can still be utilised with regard to blades manufactured and provided in accordance with aspects of the present invention.

Any concerns with regard to stress can be overcome by careful positioning of the shear layers and core segments such that in use normal operational stresses can be accommodated whilst the root segment reacts to tension in certain planes as a result of impact and fragmentation appropriately to disintegrate the blade or by slippage absorb some energy at the shear surfaces and in particular the root section.

The invention provides design flexibility through choice of the core in terms of segment shape, size and position along with location of the shear surfaces between the parts in the core and blade.

The blade will remain secure and strong under normal working conditions due to relative compression whilst break up will occur with a blade off impact along with energy absorption at the shear surfaces.

Figure 12:
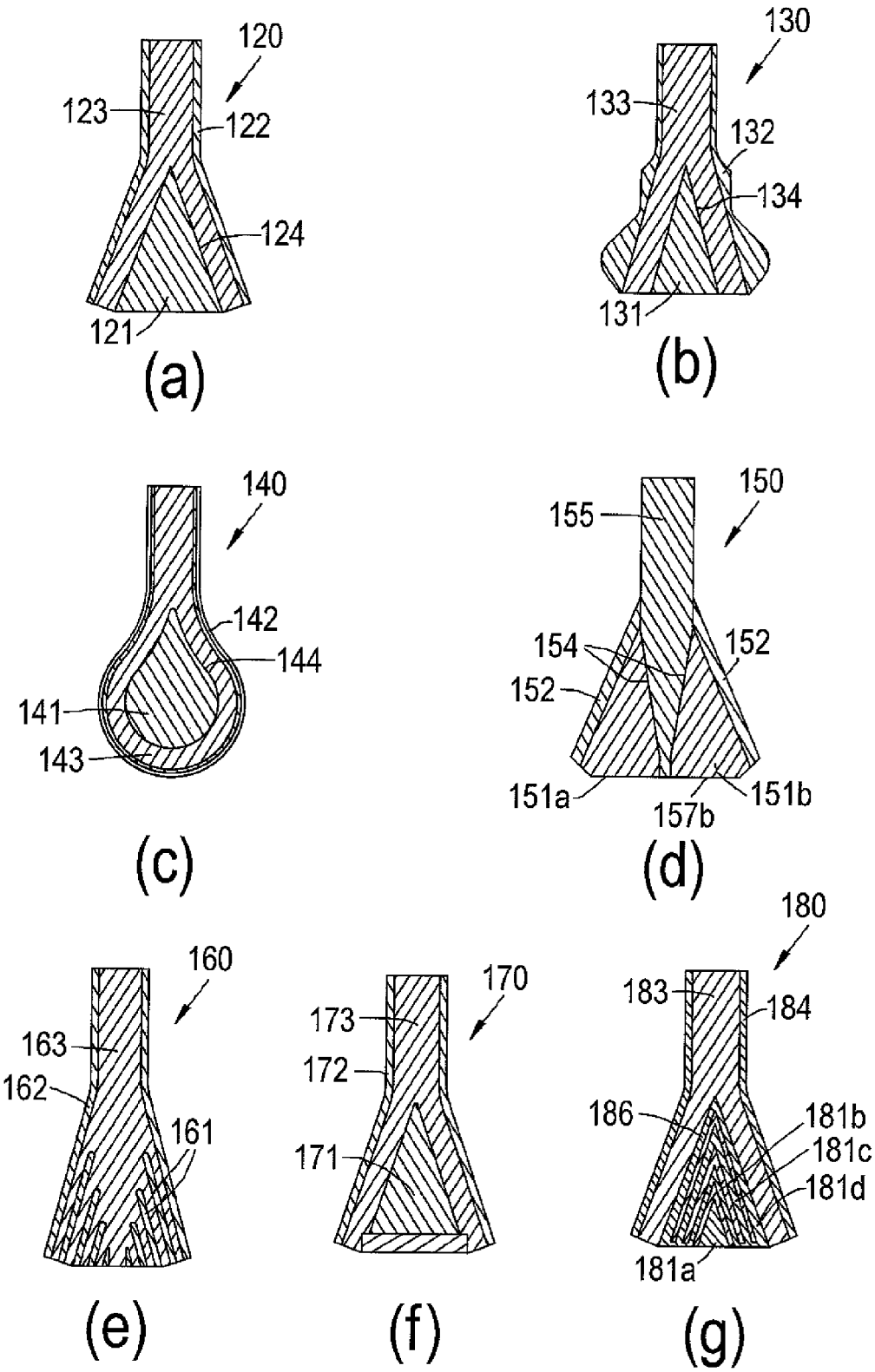

As indicated above particular configuration of the root section in accordance with aspects of the present invention will depend upon operational requirements. FIG. 12 provides examples of possible root section configurations in accordance with aspects of the present invention.

FIG. 12a illustrates a basic wedge configuration in which a core 121 is presented within a blade 120 with a metal cover 122 and a substrate 123 in a composite construction. It will be appreciated that shear surfaces may be provided within the core 121 itself by virtue of segments and parts separated by shear surfaces. Furthermore, shear surfaces can be provided at the interface 124 between the core 121 and the substrate 123. In any event, the shear surfaces are encapsulated within the blade in particular the root section such that fluid ingress is avoided.

FIG. 12b provides a similar configuration to that depicted in FIG. 12a except, as it will be noted, the outer metal surface 132 is edged to define surface shaping for location of a root section. However, a core 131 is still provided within the blade 130 with a substrate 133. Shear surfaces can be provided within the core 131 as well as indicated above at an interface 134 between the core 131 and the substrate 133. In such circumstances in normal use a core 131 will be held in compression and therefore will resist the crushing forces applied to retain the blade 130 in use. However, during a blade-off episode it will be understood that these compressive forces are removed such that upon impact or tension in particular planes disintegration or shear slippage will occur resulting in smaller fragments and less energy during impact with a containment casing.

FIG. 12c defines a droplet configuration for a root section. Thus, a blade 140 generally has a metallic or non-metallic erosion resistant cover 142 with a substrate 143 in a composite construction. Within the blade and in particular the root section a core 141 is provided. As illustrated the core 141 is droplet shaped and is encapsulated within the blade 140. Shear surfaces can be provided at an interface 144 between the core 141 and the substrate 143 as well as within the core 141 itself.

FIG. 12d illustrates a further alternative configuration in which a double wedge is created. Thus, a blade section 155 has respective cores 151a, 151b either side. A root cover 152 (typically of metal or glass construction) is provided around the cores 151a, 151b in order to create a root section. In such circumstances interface surfaces 154 can provide shear surfaces between parts of the cores 151a, 151b.

FIG. 12e defines a further alternative root section configuration. Thus, core elements 161 are interleaved within a substrate 163 of a blade 160. The blade 160 has a external protective covering 162. Shear surfaces may be provided between the cores 161 and the substrate 163 and the shear surfaces as well as any shear surfaces within the cores 161 themselves can precipitate fragmentation and shear slippage in tension and impact.

FIG. 12f illustrates a further configuration for a root section of a blade 170. A core in the form of a wedge 171 is enclosed within the blade 170 and in particular the root section. Thus, the core 170 can provide shear surfaces between parts as well as at an interface with a substrate 173 to precipitate fragmentation under tension or impact loads. As illustrated typically a surface protective layer 172 is provided in order that the blade 170 has a composite construction. The core 171 and any shear surfaces are therefore completely enclosed and the possibility of ingress of moisture is avoided.

FIG. 12g illustrates a further configuration for a root section of a blade 180. Layered wedges are created by core elements 181 with shear surfaces 186 provided between them. In such circumstances, with the shear surfaces 186 as well as shear surfaces created within the cores 181 themselves and at the interface surface 184 to a substrate 183, provision for preferential fragmentation of the blade in tension or impact loads is provided along with energy absorption by shear surface slippage. It will be noted that in a composite structure an outer protective layer 182 is preferably present.

In the above circumstances a blade is provided which incorporates a root section having parts which have shear surfaces configured such that in normal use, that is to say in compression or crush situations the root section operates appropriately for a blade. However, for particular planes in tension or free impact loads the shear surfaces precipitate fragmentation of the blade and therefore reduce fragmentation size for impact energy loads as well as promoting initial energy losses by shear surface slippage.

Modifications and alterations to aspects of the present invention will be appreciated by those skilled in the technology. Thus, it will be understood that blades in accordance with aspects of the present invention may be formed from metal or composite materials. The cores as indicated typically comprise parts or segments with shear surfaces created appropriately between those segments to define preferential lines of fragmentation under impact or tensile bending loads. By appropriate design, positioning and extent of such shear surfaces, differential responses by the blade to tensile loads and impact forces can be designed. Essentially, the blade and in particular the root section provides operability in normal use but capability with respect to preferential fragmentation as well as energy losses by shear surface slippage when required.

What is claimed is:

1. A blade for a gas turbine engine comprising:
   a root section defining at least a first cavity;
   at least two parts forming a core within the first cavity, the parts being frangible with respect to each other;
   wherein in use when the root section is subject to a pre-determined bending load the parts will dislocate so as to aid break up of the blade.

2. A blade as claimed in claim 1 wherein the parts are separated by shear surfaces.

3. A blade as claimed in claim 2, wherein the shear surface is provided by a disjoint or slip layer between the parts.

4. A blade as claimed in claim 3 wherein the disjoint or slip layer is formed by a non-adhesive solid, liquid or gel.

5. A blade as claimed in claim 3 wherein the disjoint or slip layer is provided by a lower strength material therebetween the frangible parts designed to crumble or shatter or shear under a predetermined degree of tension.

6. A blade as claimed in claim 1 wherein the parts are provided by a plurality of segments.

7. A blade as claimed in claim 6 wherein the segments are frangible under a predetermined degree of tension in one or more of the axial, radial, and circumferential directions.

8. A blade as claimed in claim 6 wherein abutment between the segments is flat or domed or stippled or lobed or achieved through a spacer.

9. A blade as claimed in claim 2 wherein the shear surface is in a predetermined plane of the root section.

10. A blade as claimed in claim 2 wherein the shear surface extends from the root section into an aerofoil section of the blade.

11. A blade as claimed in claim 2 wherein the core is configured to dissipate energy in use by slippage along the shear surface.

12. A blade as claimed in claim 1 wherein the core remains integral by retention of association between the parts unless an excessive tension load is applied in the plane of the root section.

13. A method of forming a blade comprising the steps of:
    defining a root section having at least a first hollow cavity to receive a core,
    forming a core with at least two parts within at least the first cavity, the parts being frangible with respect to each other; and
    associating the core with the hollow cavity so that in use when the root section is subject to a pre-determined bending load the parts will dislocate so as to aid break up of the blade.

14. A method as claimed in claim 13 wherein the parts are separated by shear surfaces.

* * * * *